Feb. 23, 1960                    B. P. ARTERBURY                 2,925,866
          WELL TOOLS EMPLOYABLE AS BAILERS, FISHING TOOLS, JARS, AND
                    THE LIKE, OF THE DELAYED ACTION TYPE
Filed Oct. 10, 1955                                        3 Sheets-Sheet 1
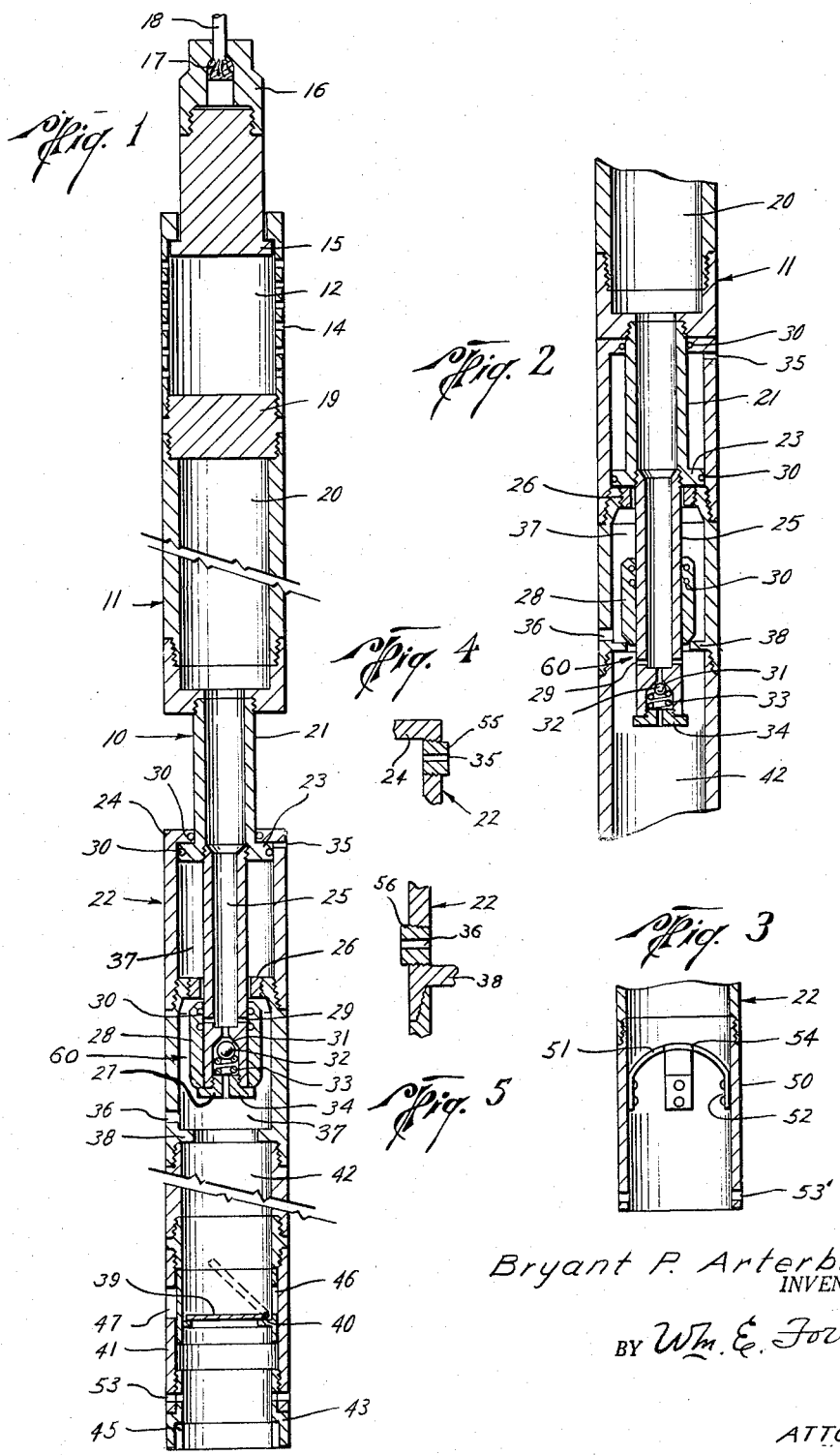
Bryant P. Arterbury
INVENTOR.
BY Wm. E. Ford
ATTORNEY

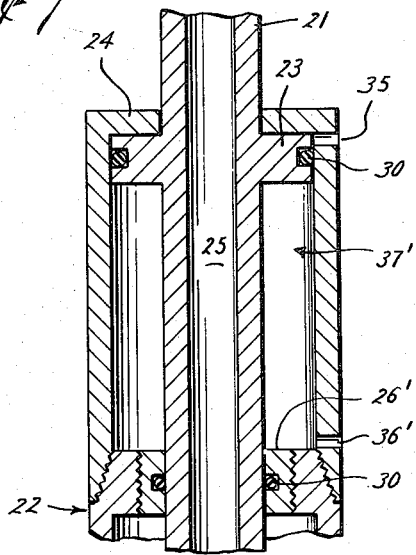
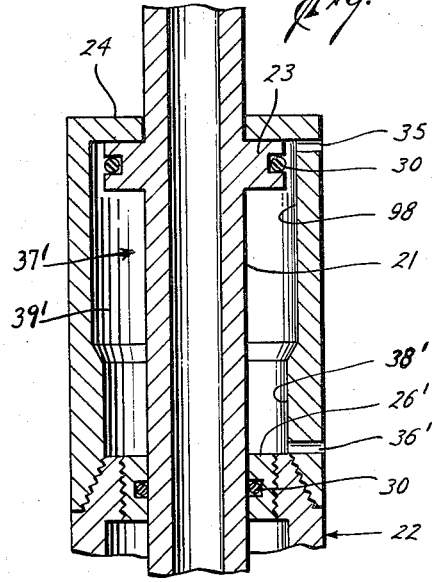
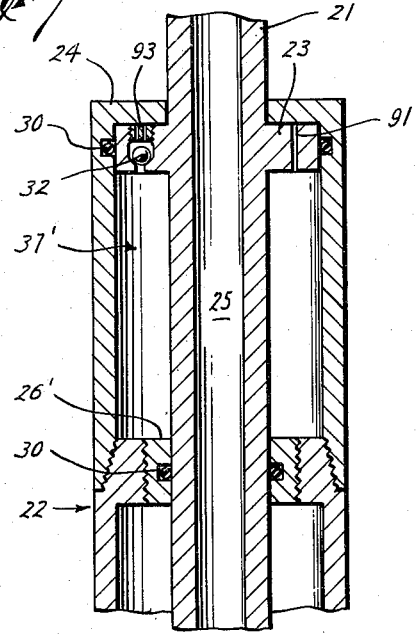
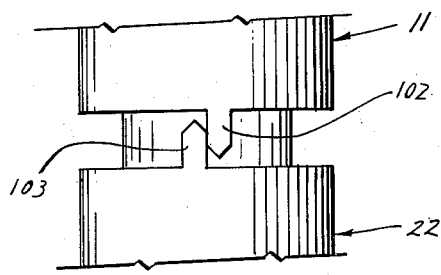
Bryant P. Arterbury
INVENTOR.
BY Wm. E. Ford
ATTORNEY

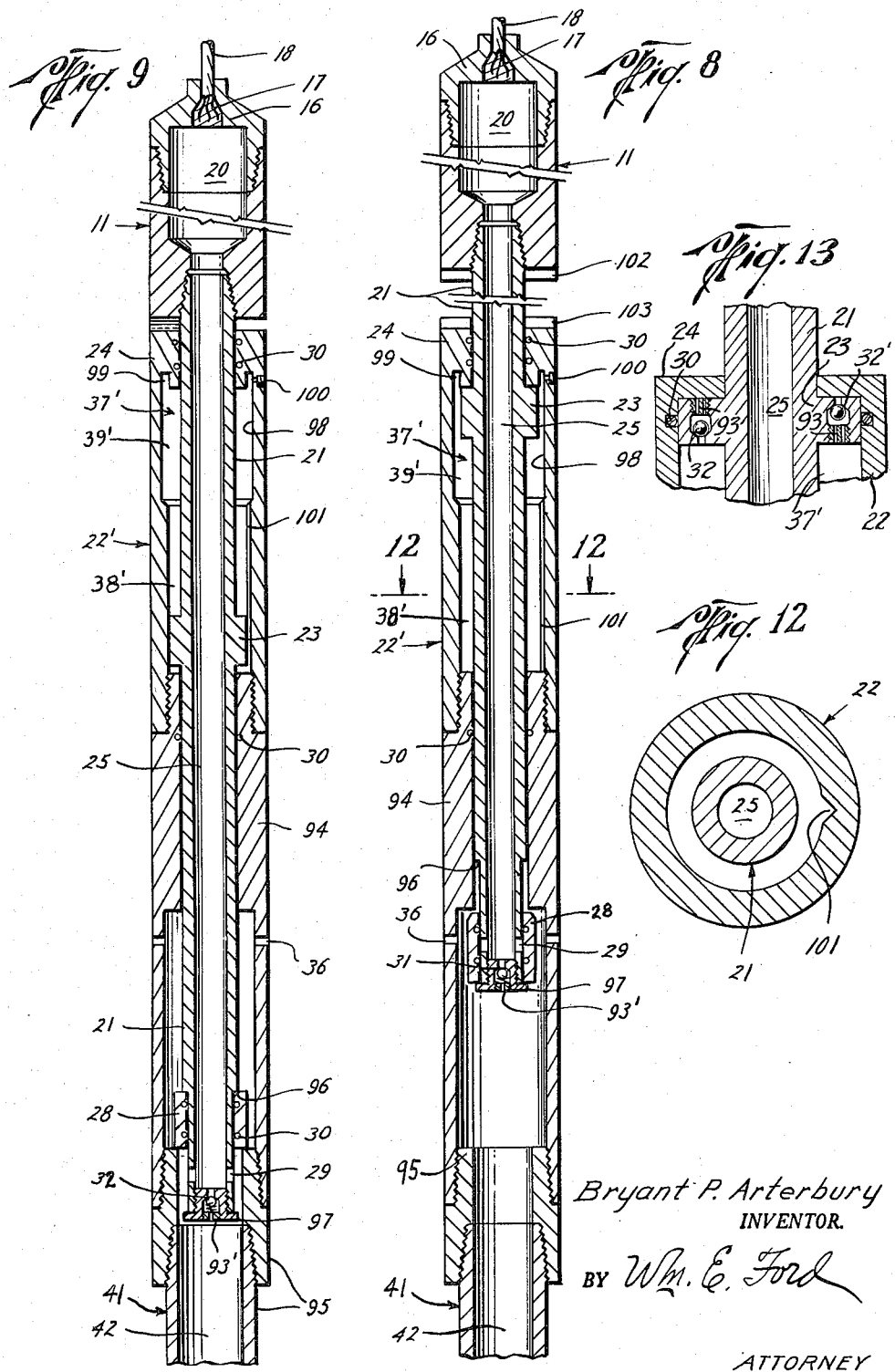

United States Patent Office 2,925,866
Patented Feb. 23, 1960

2,925,866

WELL TOOLS EMPLOYABLE AS BAILERS, FISHING TOOLS, JARS, AND THE LIKE, OF THE DELAYED ACTION TYPE

Bryant P. Arterbury, Houston, Tex., assignor of thirty-three and one-third percent to Roy L. Arterbury, Houston, Tex.

Application October 10, 1955, Serial No. 539,447

6 Claims. (Cl. 166—163)

This invention relates to well tools employable as bailers, fishing tools, jars, and the like, and especially to such tools which operate on the delayed action principle whereby the tool may first be manipulated at the bottom of the well, as to create a slurry, prior to the functioning of the tool to entrap a load of material to be removed from the well, and it also relates to such tools employable as jars to jar upwardly on the upstroke.

In the use of bailers and fishing tools commonly employed it often happens that the tool will seat at the bottom of a well wherein the sand or formation may be firm and packed. Such conventional tools are designed to function promptly upon seating to fill the loading chamber, and when the formation is packed, the tool will fill with fluid only, with the consequence that no bailing of formation, as sand, is accomplished.

This invention has as its objection the provision of a tool employable as a bailer, fishing tool, or jar which can be manipulated at the bottom of the well prior to loading, the loading action being capable of deferment to any desired time.

It is also an object of this invention to provide a tool employable as a bailer, fishing tool, or jar which does not trip as it descends the well bore through curved, bent, spiralled or restricted tubing which it may encounter.

It is also an object of this invention to provide a tool employable as a bailer, fishing tool, or jar which is adaptable for manipulation to create a slurry prior to its functioning to entrap a load to be removed from the well bore.

It is also an additional object of this invention to provide a tool employable as a bailer, fishing tool, or jar which is easily and positively unloaded at the top of the well bore.

It is another object of this invention to provide a tool employable as a bailer, fishing tool or jar which, prior to "tripping" or loading, which may be used to break up materials such as cement, drillable packers or parts, junk, and the like.

It is still another and further object of this invention to provide such a well tool employable as a bailer or fishing tool to obtain a load from the well bore, and which may also be employed as a jar on upstroke.

Other and further objects will be apparent when the specification is considered in connection with the drawings in which:

Fig. 1 is a sectional elevation of an embodiment of the invention, the tool being shown as it is lowered into a well bore;

Fig. 2 is a fragmentary sectional elevation of the embodiment of Fig. 1, the tool being shown as manipulated into loading position;

Fig. 3 is a modification of the lower end of the tool;

Fig. 4 is a fragmentary view of the ported plug controlling fluid inlet into the action chamber of the tool;

Fig. 5 is a fragmentary view of the ported plug controlling fluid outlet from the action chamber of the tool;

Fig. 6 is a fragmentary sectional elevation of another embodiment of the invention;

Fig. 7 is a fragmentary sectional elevation of still another embodiment of the invention;

Fig. 8 is a sectional elevation of another embodiment of the invention employable as a jar on upstroke, the tool being shown as it is lowered into the well bore;

Fig. 9 is a sectional elevation of the embodiment in Fig. 8, the tool being shown as manipulated into loading position;

Fig. 10 is a fragmentary sectional elevation of another embodiment of the form of the invention shown in Figs. 8 and 9;

Fig. 11 is a fragmentary enlarged elevational view of the tooth engagement of mandrel and housing sleeve shown in Fig. 9;

Fig. 12 is a sectional plan view taken along line 12—12 of Fig. 8; and

Fig. 13 is a sectional elevation of a variation of the embodiment of Fig. 7.

In the embodiment of the invention shown in Figs. 1 and 2, a bailer or fishing tool 10 is shown which may be lowered into a well bore by means of a wire line 18. A mandrel 11 having an upper chamber 12 perforated at 14 receives therein a flanged head 15 and such head extends upwardly from the chamber 12 and has connected thereto a cap 16 which receives the standard end 17 of the wire line 18, lead then being poured thereinto to harden so that the end 17 serves as the anchor by which the tool 10 is lowered from the top of the well bore.

Below the upper, perforate chamber 12 the mandrel 11 has a partition 19 thereacross to divide off the mandrel therebelow into an enclosed chamber or air compartment 20. A reduced diameter section 21 is connected to the lower end of the compartment 20 and extends downwardly through the top of a tubular member 22, which may be termed a loading tube, and has thereon a piston 23 to shoulder upwardly against a top closure 24 of such tubular member 22.

The mandrel 11 includes a lower, tubular terminal section 25 which extends below the piston 23 and through a partition ring 26 across the member 22 through which the mandrel 11 extends with clearance.

The section 25 provides a flow passage 31 through the lower end thereof which is controlled by a ball valve 32 which seats therein as urged by a spring 33 which bears downwardly on a ported closure plug 34. Such ported closure plug 34 is threaded into the lower end of the section 25 to retain the spring 33 and ball valve 32 therein, and has a flange 27 as the lower part thereof. A valve sleeve 28 is slid onto the lower end of the section 25 before the plug 34 is assembled therewith, and when the plug 34 is assembled into position the flange 27, which is of larger diameter than the outer diameter of the section 25, acts as a retaining stop for the sleeve 28 and prevents it from sliding off the lower end of the section. Seals 30 in the valve sleeve 28 are provided to seal above and below lateral ports 29 therein to prevent leakage, and in lowering position the sleeve 28, bearing at its lower end on the flange 27, is positioned to occlude the ports 29.

A port 35 is provided near the top of the tubular member 22 and a port or outlet 36 is also provided in valve chamber 37 adjacent a lower partition 38 therein. Optionally the port 35 may be provided in an orifice plug 55 threadable into the member 22 adjacent the top closure 24 as shown in Fig. 4. Also optionally the port 36 may be provided in an orifice plug 56 threadable into the wall of the tubular member 22 just above the partition 38 as shown in Fig. 5.

The tubular member 22 includes a section below the partition 38 which provides a chamber 42 and at the lower end of such chamber a trap door 39 is hinged in the tubular member 22 at 40 to control fluid inlet into the chamber 42 from a tubular section 41 forming the lowermost element of the member 22, and to be further described hereinbelow. A seal 30 is provided on the piston 23 to seal against the inner wall of the tubular member 22. Also a seal 30 is provided in the tubular member top 24 to seal around the mandrel section 21.

In operation the tool is lowered into the well with the mandrel supported on the flanged head 15 to which connection is made by the wire line 18. In turn the tubular member 22 is supported on the piston 23 as to top 24 of such member bears on the upper surface of the piston 23. Upon touching the bottom of the well bore the head 15 in the chamber 12 may move downwardly if the wire line 18 is further lowered, and this will force fluid in the chamber 12 out through the perforations 14.

In order to create a slurry, the tool is lifted and then dropped to fall upon the bottom of the well bore as the formation thereat, as sand, has to be removed to arrive at the most effective well flowing conditions. Then the bailer is filled with the slurry and is drawn up from the well and emptied. This process is continued until the bottom of the well is cleaned.

In working up this slurry with the tool of this invention, upon each impact of the tubular member 22 with the bottom, there occurs about one or two inches travel of the piston 23 with relation to the tubular member 22, but this travel is not enough to lodge the valve sleeve 28 against the partition 38, and let the mandrel section 21 move downwardly enough to uncover the ports 29.

The size of the smaller of the ports 35 or 36 controls the delayed action. In the case where the upper port 35 is the smaller, the hydrostatic fluid must enter above the piston 23 to break vacuum which the piston would otherwise have to pull, and in the case of the lower port 36 being smaller and controlling the delayed action, its size controls the rate of downward passage of the mandrel which can move downwardly no faster than the fluid can be ejected through the restricted lower port 36. If slurry occurs at the bottom of the well before the tool is lowered, the valve is tripped promptly after the lower end of the tool is lowered thereinto, or otherwise the valve is tripped after the tool has been successively raised and lowered to create the slurry, as has been hereinabove described. In any case there must be an inherent delay before the position of Fig. 2 can be achieved.

When the ports 29 are finally uncovered the pressure differential between the air chamber within the mandrel 11 at substantially atmospheric pressure, and the hydrostatic fluid in the valve chamber 42 tends to equalize with the result that there is an instantaneous upward rush of fluid into the mandrel air chamber and this rush of fluid draws along with it the slurry, muck, or matter at the bottom of the well bore and draws it past the valve 39 and into the load chamber 42 and upwardly.

The pressure of the fluid in the upper part of the valve chamber 37 has previously been equalized with the hydrostatic fluid in the well bore, by virtue of fluid communication therebetween through the port 36, and it follows that the equalizing of the pressure in the chamber 42 below the partition 38 with the substantially atmospheric pressure in the air chamber of the mandrel causes a low pressure area in this chamber 42 as compared with the pressure in the chamber 37 thereabove so that, as the mandrel 11 is lifted, the valve sleeve 28 is held seated on the partition 38 by this pressure differential during such time as the hydrostatic fluid flows into the chamber 42 in degree to equalize pressure therein.

After the pressure in chambers 37 and 42 has been equalized as the mandrel is further lifted, the valve sleeve 28 rises due to its frictional engagement with the mandrel section 21 until it contacts the partition 26 and is thus forced downwardly with relation to the mandrel section 21 until it again occludes the ports 29, as shown in Fig. 1. In the meantime the flapper valve 39 has been closed by the force of gravity of the load of slurry, muck, and other formation particles therein and as the mandrel is lifted by the wire line, the tubular member 22 is lifted by the piston 23, with the load entrapped above the flapper valve 39. After the valve sleeve 28 has been moved off the partition 38, flow can occur between the chambers 37 and 42.

After the pressure within the mandrel has been equalized with the high hydrostatic pressure of the well bottom area, the lifting of the tool brings the valve sleeve 28 into contact with the partition 26 and causes it to occlude the ports 29, and thereafter during the lifting of the tool from the well bore it passes upwardly through regions of diminishing hydrostatic pressure. Thus, as this diminished pressure area above is traversed the check ball 32 is unseated by the excess of pressure within the mandrel greater than the pressure of the spring 33 so that a constant and desired pressure differential is maintained between mandrel interior pressure and the successively lower hydrostatic pressures available thereabove and accessible to the tubular member 22 or load chamber. The substantial degree of frictional contact between sleeve valve 28 and the mandrel surface adjacent the ports 29 prevents leakage from the mandrel interior so that differential control is directed through the check valve.

When the bailer arrives at the top of the well to be emptied, slots 45 on opposite sides of the tubular member bottom 43 are placed over a vertical plate or key which is mounted and of a length to extend across the bottom and bear at each end in such slots. The tubular member 41 is then turned with relation to the member 43 and with relation to the mandrel assembly 22 thereabove and this brings a port or door 46 in the mandrel assembly 22 and just above the flapper valve 39 in the load chamber into communication with a corresponding port or door 47 in the bottom element 41. The mandrel is now moved to open the sleeve valve 28 with the result that the pressure differential between the interior of the mandrel and the interior of the tubular member 22 will force all of the muck, slurry, and load material out through the doors 46, 47 and evacuate the tool.

To operate as a fishing tool an element 50, shown in Fig. 3, replaces the bottom member 43 of the tubular member 22. Such a member has therein, at a spaced distance below the flapper valve 39 springs 51 which have their lower ends 52 fixed to the member 50 but which have their upper ends 54 curved upwardly and inwardly toward convergence. As these elements are made of spring steel they have ample resilience to let the objects to be fished out the well bore pass upwardly therethrough, such objects being broken pieces of bit cones, bolts, nuts, and other structure which may have congregated at the bottom of the well in the course of drilling.

As shown in Fig. 1, ports 53 are provided at the bottom of the tubular element 22 to engage in register to permit hydrostatic fluid circulation into and out of this part of the tool. Likewise, similar ports 53' for the same function are provided for the element 50 shown in Fig. 3.

In reiteration a special feature of the invention resides in the fact that the hydraulic fluid system which retards the opening or tripping of the assembly which may be termed a valve assembly 60, and which includes the tubular mandrel section 21, its ports 29, the valve sleeve 28, and the partition 38, may be controlled as to the extent of opposition it presents to the downward passage of the piston 23, such control being effectuated simply by controlling the size of the ports 35 and/or 36.

Another embodiment of the invention is shown in

Fig. 6 in which the structure of Fig. 1 is changed by making the partition 26' fluid tight as by providing therein an O-ring 30. Also a port 36' is provided at the bottom of the chamber 37'. In this construction the delayed action in tripping is obtained since the downward motion of the piston 23 is retarded by the rate at which the well bore fluid can be ejected from the lower port 36' and/or by the rate the well bore fluid enters the chamber 37' above the piston 23 to relieve the vacuum otherwise existing on piston downstroke. Reversely on upstroke fluid is evacuated through the port 35 and drawn in through the port 36'. As an optional feature the port 35 may be eliminated from this embodiment and a tolerance or clearance provided between the top closure 24 and the mandrel section 21 so that fluid is drawn in through such clearance or tolerance space on downstroke and evacuated therethrough on upstroke.

The structure of Fig. 6 may be modified by elimination of both ports 35 and 36' and by providing instead a bleed hole 91 through the piston 23, as shown in Fig. 7. Additively the piston may be bored, counterbored, and countersunk to provide a seat for a check ball 32 with the counterbore closed by a ported plug 93 threaded thereinto. The chamber 37' is then pre-filled with a liquid, as oil, before the tool is put in operation. Then on downstroke, the dashpot action of delay is obtained by the upward passage of fluid through the piston bleed hole 91, and optionally additively through the piston via the check ball 32 and through the ported plug 93. Reversely, on upstroke in the piston 23, as shown, the fluid above the piston can return therebelow only through the bleed hole 91. As shown in Fig. 13, the effectuation of upstroke may be enhanced by additionally providing with the structure of Fig. 7 a check ball 32' which seats upwardly and hence is seated on downstroke while fluid may pass downwardly thereby on upstroke.

A tool of the type hereinabove described may be converted to provide a jarring effect on upstroke by an arrangement as disclosed in Figs. 8 and 9. Fig. 8 shows such a tool as it is lowered into the well bore on a wire line 18 connected by threaded engagement directly to the mandrel 11, the piston 23 of the mandrel supporting the closure head 24 of the body member 22, and O-rings 30 in the closure head sealing against leakage therethrough. The body 22' has a lower section 94 which is of reduced inner diameter to sealably receive the mandrel section 21 therethrough, sealing being assured by providing O-rings 30 in the mandrel section and in the section 94 as shown in Fig. 8.

The lower part of the section 94 is of larger inner diameter and has ports 36 therein communicating with the well bore. The lower end of the section 94 is threaded internally to receive therein a sub or connection member 95 providing an upwardly facing shoulder, and therebelow there is connected a structure as that shown at the bottom of Fig. 1 including the flapper valve 39, and if the tool is to be used as a fishing tool the member 43 is replaced by the element 50 shown in Fig. 3.

A downwardly facing shoulder 96 is provided on the mandrel section 21 and therebelow lateral ports 29 are provided in the side walls of the mandrel section, and the lower end of the mandrel section has the check valve housing 97 threaded thereinto and provides a seat therein and passage thereabove and an upwardly spring urged check ball 32 is seated upwardly in such seat, a ported plug 93' providing the lower closure for the check valve and base for its spring.

To operate as a jar the tool is relieved at 98 to provide a recess near the top of the chamber 37'. An annular groove 99 is formed in the under surface of the head 24 and a bored, counterbored, and countersunk passage from the exterior of the housing sleeve or tubular member 22 communicates with such annular groove 99 and has the outer part of the counterbore threaded to receive a filler plug 100 therein. Below the relieved section 98 a groove 101 is provided in the wall of the chamber 37' to extend downwardly continuously to the upper face of the section 94.

To put the tool in operation the filler plug 100 has been removed and the chamber 37' filled with a liquid, as oil, and the plug replaced. Then on downstroke of the mandrel, after the housing sleeve 22' has bottomed, the dashpot action is obtained by the upward passage of the liquid through the groove 101 as the piston 23 descends. Reversely on the upstroke of the piston 23, which may take place as when the housing sleeve 22' may be stuck in the well bore, first the upstroke is delayed as the liquid above the piston must flow downwardly.

Such tool as shown in Figs. 8 and 9 operates as a bailer or fishing tool by virtue of the arrangement whereby, after the housing 22' has bottomed, the mandrel is lowered until the sleeve valve 28 shoulders on the connection member 95 and the mandrel is further lowered until its valve ports 29 are clear of the valve sleeve 28, whereupon the pressure differential between the mandrel interior, at substantially atmospheric pressure, and the pressure of the fluid in the chamber 42, results in the equalization of pressure causing an upsurge of material via the flapper valve 39 into the load chamber 42. In case the element 50 has been employed instead of the element 43, the material will include fished matter, as for instance bit parts, whereas if the element 43 is employed, generally the material will comprise slurry and any other material which may be mixed therewith.

To obtain a jarring effect on the upstroke, as the mandrel is raised, the piston 23 moves upwardly with relatively tightly fitting peripheral engagement with the lower bore 38' of the chamber 37', while the fluid thereabove passes downwardly through the groove 101, and in amount limited by such groove. This slow upward movement continues as limited by the size of the groove 101 until the bottom of the piston 23 clears the top of the reduced diameter bore 38' in the lower end of the chamber 37'. At this juncture considerable of the stretch in the wire line 18 is relieved and the mandrel 11 can snap upwardly with the contraction of such stretch as the piston 23 moves into the enlarged bore 39' forming the upper end of the chamber 37', such bore being of sufficient diameter to permit the easy downward passage of the fluid above the piston through the annular space provided between the piston and the upper wall of the chamber 37' as the piston 23 moves rapidly upward into jarring impact with the top closure 24.

To inhibit rotation between the mandrel 11 and housing 22' when the tool is in tripped position as shown in Fig. 9, a tooth 102, Fig. 8, is provided in the downwardly facing shoulder on the head of the mandrel, and a corresponding tooth 103 is provided in the upwardly facing shoulder on the top surface of the housing closure 24. The distance between the mandrel shoulder 96 (as it bears on the valve sleeve 28 in shouldered position on the member 95) and the lower point of the tooth 102 being such with relation to the distance between the top face or shoulder of the connection member 95 and the upper point of the tooth 103, that such teeth points are clear of the shoulder of the mandrel and the housing top thereby permitting the shoulder 96 to bear upon the valve sleeve 28 as it seats on the member 95, whereas rotation of the mandrel right handedly with relation to the housing will bring the side faces of the teeth 102, 103 into abutment to inhibit relative rotation between mandrel and housing.

As shown in Fig. 10 tools designed for employment as bailers or fishing tools may be modified for additional employment as jars on the upstroke by making the partition 26' fluid tight and providing a reduced diameter lower bore 38' in the lower end of the chamber 37' and a larger diameter bore 39' thereabove. Then as shown in Fig. 1 an upper port 35 is provided in the housing 22' and also a lower port 36'. Thus as the piston 23 moves downwardly fluid is evacuated through the port 36' and drawn in through the port 35. On the upstroke the piston 23, in sealable engagement with the bore 38', passes slowly upwardly therein as the wire line 18 is stretched due to the pull exerted thereon, and as the fluid above the piston 23 is evacuated through the upper port 35. Then when the bottom of the piston 23 is pulled above the top of the lower bore 38' to pass completely into the upper bore 39' the piston is freed from retarded motion and the wire line 18 can contract and pull the piston rapidly upwardly and into jarring contact with the top closure 24 of the housing 22', thereby loosening the housing 22' if it may be in any manner stuck or restrained against upward passage, the fluid above such piston passing in part out the port 35 and in part downwardly through the annular space in the bore 39' outwardly of the piston 23.

As an optional feature of construction the port 35 may be eliminated from the structure of Fig. 10 and a clearance space provided in the top closure 24 around the mandrel 21 of such tolerance to provide a fluid escape area equivalent to the area of the port 35.

In some cases the structure of Figs. 8 and 9 may be changed to operate as a mechanical jar by the simple expedient of removing the plug 100 from the top of the chamber 39' and by providing an opening in the bottom of the chamber 38' corresponding to the opening 36' in Fig. 10. Then by providing that the openings 100 and 36' are of considerable size, the resistance offered by the well bore fluid to the downward or upward passage of the piston 26 is minimized and the mandrel may be raised or lowered to respectively bring the piston 26 into jarring impact with the top closure 24 or the shoulder at the bottom or chamber 38'.

As another optional feature of construction and employment the tools hereinabove disclosed may be operated on tubular strings, as pipe strings as well as wire lines, the only change required in the case of any of the structures shown simply being the substitution of an externally threaded pipe section as the lowermost element of the tubular element or pipe string, in place of the wire line connector element 16. It is well established that a well bore pipe string under pull will undergo substantial stretch so that a jarring effect is obtained upon release of substantial decrease of pulling tension.

Broadly this invention includes well tools employable as bailers and/or fishing tools of the delayed action type, permitting extended manipulation prior to tripping to take on a load of material, and it also relates to such tools employable on the upstroke as jars, the broad spirit of the invention including a wide variety of structural modifications and embodiments other than the illustrative forms of the invention disclosed in the drawings, and such broad spirit of the invention warranting a broad scope of interpretation for the appended claims.

What is claimed is:

1. A delayed action tool for employment as a bailer, fishing tool, and the like and including a hollow mandrel to which a connection is made to lower said tool into a well bore and having a piston thereon, a tubular member including a closed fluid filled upper chamber in which said piston moves and supports said tubular member as it is lowered into the well bore and a loading chamber sealed therefrom into which said mandrel extends, by-pass groove means in the wall of said upper chamber whereby a restricted fluid passage is provided outwardly of said piston, port means provided in the lower end of said mandrel which extends into said loading chamber, a valve sleeve occluding said port means to maintain the mandrel interior at substantially atmospheric pressure as said tool is lowered into the well bore from the surface, a stop in said loading chamber below said valve sleeve as said tool is lowered, valve means provided in said loading chamber below said stop to permit the upward passage of well bore material and to inhibit downward escape of said material, opening means provided in the wall of said loading chamber above said valve means and well bore fluid which has entered said loading chamber through said opening means being displaced outwardly therethrough by the downward movement of said mandrel as said valve means remains closed, said upper chamber fluid opposing downward passage of said piston with relation to said tubular member, said mandrel lodging said valve sleeve upon said stop to uncover said mandrel port means upon being lowered with relation to said tubular member against the resistance of said upper chamber fluid as movement of said tubular member is restrained whereby the resulting equalization of pressure between mandrel interior and loading chamber interior causes material to be drawn through said valve means into said loading chamber thereabove.

2. A delayed action tool for employment as a bailer, fishing tool, and the like and including a hollow mandrel to which a connection is made to lower said tool into a well bore and having a piston thereon, a tubular member including a closed fluid filled upper chamber in which said piston moves and supports said tubular member as it is lowered into the well bore and a loading chamber sealed therefrom into which said mandrel extends, by-pass groove means in the wall of said upper chamber whereby a restricted fluid passage is provided outwardly of said piston, port means provided in the lower end of said mandrel which extends into said loading chamber, a valve sleeve occluding said port means to maintain the mandrel interior at substantially atmospheric pressure as said tool is lowered into the well bore from the surface, a stop in said loading chamber below said valve sleeve as said tool is lowered, and valve means provided in said loading chamber below said stop to permit the upward passage of well bore material and to inhibit downward escape of said material, said upper chamber fluid opposing downward passage of said piston with relation to said tubular member, said mandrel lodging said valve sleeve upon said stop to uncover said mandrel port means upon being lowered with relation to said tubular member against the resistance of said upper chamber fluid as movement of said tubular member is restrained whereby the resulting equalization of pressure between mandrel interior and loading chamber interior causes material to be drawn through said valve means into said loading chamber thereabove, the upper part of said upper chamber being of enlarged diameter and said piston sliding snugly in the lower part of said upper chamber whereby upon said mandrel being raised with relation to said tubular member to pass said piston into said enlarged upper part, the resulting contraction of the mandrel lowering means brings said piston into jarring impact with the top of said tubular member.

3. A delayed action tool for employment as a bailer, fishing tool, and the like and including a hollow mandrel to which a connection is made to lower said tool into a well bore and having a piston thereon, a tubular member including a fluid filled upper chamber in which said piston moves and supports said tubular member as it is lowered into the well bore and a loading chamber sealed therefrom into which said mandrel extends, by-pass groove means in the wall of said upper chamber whereby a restricted fluid passage is provided outwardly of said piston, port means provided in the lower end of said mandrel which extends into said loading chamber, a valve sleeve occluding said port means to maintain the mandrel interior at substantially atmospheric pressure as said tool is lowered, a stop in said loading chamber below said valve sleeve as said tool is lowered into the well bore from the surface, and valve means provided in said loading chamber below said stop to permit the upward passage of well bore material and to inhibit downward escape of said material, the well bore fluid in said upper chamber opposing downward passage of said piston with relation to said tubular member, said mandrel lodging said valve sleeve upon said stop to uncover said mandrel port means upon being lowered with relation to said tubular member against the resistance of the well bore fluid in said upper chamber as movement of said tubular member is restrained whereby the resulting equalization of pressure between mandrel interior and loading chamber interior causes material to be drawn through said valve means into said loading chamber thereabove, the upper part of said upper chamber being of enlarged diameter and said piston sliding snugly in the lower part of said upper chamber whereby upon said mandrel being raised with relation to said tubular member to pass said piston into said enlarged upper part, the resulting contraction of the mandrel lowering means brings said piston into jarring impact with the top of said tubular member, said upper chamber providing opening means in at least one of the top and bottom thereof and having plug means in said opening means with opening means provided in said plug means of orifice size whereby said plug means provides the orifice means through which fluid from the well bore may pass into and out of said upper chamber.

4. A delayed action tool for employment as a bailer, fishing tool, and the like and including a hollow mandrel to which a connection is made to lower said tool into a well bore and having a piston thereon, a tubular member including a closed fluid filled upper chamber in which said piston moves and supports said tubular member as it is lowered into the well bore and a loading chamber sealed therefrom into which said mandrel extends, orifice means provided in said piston from above to below and restricting said piston to move against the resistance of fluid passage through said orifice, port means provided in the lower end of said mandrel which extends into said loading chamber, a valve sleeve occluding said port means to maintain the mandrel at substantially atmospheric pressure as said tool is lowered into the well bore from the surface, a stop in said loading chamber below said valve sleeve as said tool is lowered, valve means provided in said loading chamber below said stop to permit the upward passage of well bore material and to inhibit downward escape of said material, opening means provided in the wall of said loading chamber above said valve means and well bore fluid which has entered said loading chamber through said opening means being displaced outwardly therethrough by the downward movement of said mandrel as said valve means remains closed, said upper chamber fluid opposing downward passage of said piston with relation to said tubular member, said mandrel lodging said valve sleeve upon said stop to uncover said mandrel port means upon being lowered with relation to said tubular member against the resistance of said upper chamber fluid as movement of said tubular member is restrained whereby the resulting equalization of pressure between mandrel interior and loading chamber interior causes material to be drawn through said valve means into said loading chamber thereabove.

5. A delayed action tool for employment as a bailer, fishing tool, and the like and including a hollow mandrel to which a connection is made to lower said tool into a well bore and having a piston thereon, a tubular member including a closed fluid filled upper chamber in which said piston moves and supports said tubular member as it is lowered into the well bore and a loading chamber sealed therefrom into which said mandrel extends, opening means provided in said upper chamber at the top and bottom thereof, port means provided in the lower end of said mandrel which extends into said loading chamber, a valve sleeve occluding said port means to maintain the mandrel at substantially atmospheric pressure as said tool is lowered into the well bore from the surface, a stop in said loading chamber below said valve sleeve as said tool is lowered, valve means provided in said loading chamber below said stop to permit the upward passage of well bore material and to inhibit downward escape of said material, opening means provided in the wall of said loading chamber above said valve means and well bore fluid which has entered said loading chamber through said opening means being displaced outwardly therethrough by the downward movement of said mandrel as said valve means remains closed, said upper chamber fluid opposing downward passage of said piston with relation to said tubular member, said mandrel lodging said valve sleeve upon said stop to uncover said mandrel port means upon being lowered with relation to said tubular member against the resistance of said upper chamber fluid as movement of said tubular member is restrained whereby the resulting equalization of pressure between mandrel interior and loading chamber interior causes material to be drawn through said valve means into said loading chamber thereabove.

6. A delayed action tool for employment as a bailer, fishing tool, and the like and including a hollow mandrel to which a connection is made to lower said tool into a well bore and having a piston thereon, a tubular member including a closed fluid filled upper chamber in which said piston moves and supports said tubular member as it is lowered into the well bore and a loading chamber sealed therefrom into which said mandrel extends, opening means provided in said upper chamber at the top and bottom thereof and the upper portion of said chamber being of larger inner diameter than the outer diameter of said piston whereby said piston moves therein with less restriction than in the lower portion of said upper chamber which is of diameter that the piston moves in frictional contact with the walls thereof, port means provided in the lower end of said mandrel which extends into said loading chamber, a valve sleeve occluding said port means to maintain the mandrel at substantially atmospheric pressure as said tool is lowered into the well bore from the surface, a stop in said loading chamber below said valve sleeve as said tool is lowered, valve means provided in said loading chamber below said stop to permit the upward passage of well bore material and to inhibit downward escape of said material, opening means provided in the wall of said loading chamber above said valve means and well bore fluid which has entered said loading chamber through said opening means being displaced outwardly therethrough by the downward movement of said mandrel as said valve means remains closed, said upper chamber fluid opposing downward passage of said piston with relation to said tubular member, said mandrel lodging said valve sleeve upon said stop to uncover said mandrel port means upon being lowered with relation to said tubular member against the resistance of said upper chamber fluid as movement of said tubular member is restrained whereby the resulting equalization of pressure between mandrel interior and loading chamber interior causes material to be drawn through said valve means into said loading chamber thereabove.

References Cited in the file of this patent
UNITED STATES PATENTS

| | | |
|---|---|---|
| 2,054,606 | Smith | Sept. 15, 1936 |
| 2,118,458 | Cavins | May 24, 1938 |
| 2,139,075 | Gates | Dec. 6, 1938 |
| 2,198,490 | Tarkington | Apr. 23, 1940 |
| 2,397,473 | Crowell | Apr. 4, 1946 |
| 2,678,805 | Sutliff | May 18, 1954 |
| 2,733,045 | Burns | Jan. 31, 1956 |